(12) United States Patent
Scura et al.

(10) Patent No.: US 7,733,610 B2
(45) Date of Patent: Jun. 8, 2010

(54) LOAD/UNLOAD RAMP FOR AN ACTUATOR ASSEMBLY IN A DATA STORAGE DEVICE

(75) Inventors: John Edward Scura, Paso Robles, CA (US); John Michael Beley, Moorpark, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 688 days.

(21) Appl. No.: 11/673,232

(22) Filed: Feb. 9, 2007

(65) Prior Publication Data

US 2007/0188929 A1  Aug. 16, 2007

Related U.S. Application Data

(60) Provisional application No. 60/772,336, filed on Feb. 10, 2006.

(51) Int. Cl.
*G11B 5/55* (2006.01)
(52) U.S. Cl. .................................. 360/265.7
(58) Field of Classification Search ................ 720/672; 360/244.2, 244.8, 246.3, 265.7, 265.9, 266.1, 360/294.7
See application file for complete search history.

(56) References Cited

U.S. PATENT DOCUMENTS

| | | | |
|---|---|---|---|
| 5,134,608 A | 7/1992 | Strickler et al. | |
| 5,734,527 A | 3/1998 | Reinhart | |
| 6,025,968 A | 2/2000 | Albrecht | |
| 6,381,103 B1 | 4/2002 | Misso et al. | |
| 6,480,361 B1 | 11/2002 | Patterson | |
| 6,498,703 B2 | 12/2002 | Misso et al. | |
| 6,507,461 B1 | 1/2003 | Kimura et al. | |
| 6,567,242 B2 | 5/2003 | Misso et al. | |
| 6,574,073 B1 | 6/2003 | Hauert et al. | |
| 6,731,468 B2 | 5/2004 | Williams et al. | |
| 6,751,064 B2 * | 6/2004 | Kuwajima et al. | 360/244.8 |
| 6,801,403 B2 | 10/2004 | Miyajima | |
| 6,950,285 B2 * | 9/2005 | Wada et al. | 360/265.7 |
| 6,963,473 B2 * | 11/2005 | Honda et al. | 360/294.7 |
| 7,046,484 B2 * | 5/2006 | Honda et al. | 360/266.1 |
| 7,265,939 B2 * | 9/2007 | Kuwajima et al. | 360/99.08 |

* cited by examiner

*Primary Examiner*—Angel A. Castro
(74) *Attorney, Agent, or Firm*—Leanne Taveggia Farrell; Westman, Champlin & Kelly, P.A.

(57) ABSTRACT

An actuator assembly is provided having a ramp for unloading a transducing head from a storage medium. The actuator assembly includes an actuator arm rotatable about a pivot point and configured to access data on a storage medium. The actuator arm has a base end coupled to a lift tab and a distal end coupled to a transducing head. The actuator assembly also includes an inclined surface located adjacent the base end. The inclined surface is configured to engage with the lift tab to guide the transducing head away from the storage medium.

16 Claims, 7 Drawing Sheets

LOAD/UNLOAD RAMP FOR AN ACTUATOR ASSEMBLY IN A DATA STORAGE DEVICE

CROSS REFERENCE TO RELATED APPLICATION

This application claims the benefit of U.S. Provisional Application 60/772,336, filed on Feb. 10, 2006 entitled "SIMPLIFIED LOAD/UNLOAD RAMP ASSEMBLY," the disclosure of which is incorporated herein by reference in its entirety.

BACKGROUND

A typical data storage system includes a housing that encloses a variety of components. For example, in a disc drive, the components include at least one rotating disc having data on one or more surfaces that are coated with a medium for storage of digital information. The disc(s) are mounted on a spindle motor that causes the disc(s) to spin. Each surface of the disc(s), which are coated with a medium, pass under a respective bearing slider surface. Each slider carries transducers, which write information to and read information from the data surfaces of the disc(s). The slider and transducers are often together referred to as the "head."

An actuator assembly moves the head or heads from an inner diameter to an outer diameter of a storage medium and across data tracks under control of electronic circuitry. The actuator assembly includes a track accessing arm, a suspension for each head and a voice coil motor. In general, each head is supported by a suspension that is in turn attached to the track accessing arm. The voice coil motor rotates the track accessing arm about a pivot shaft to position a head over a desired data track.

When the data storage system is de-energized, the actuator assembly can move the head or heads attached to the track accessing arm to a location on the storage medium designated as the "park" location. The park location is usually located about an outer diameter or an inner diameter of the storage medium and is typically called the landing or parking zone of the medium. The landing zone of the storage medium generally does not include any useable data because of the physical contact between the head and the storage medium in the landing zone. In addition, the landing zone can be roughened to minimize stiction of the head against the storage medium.

Alternatively, the actuator assembly can move the head(s) to a load/unload ramp, which serves as a park location that is adjacent the storage medium. Generally, the load/unload ramp is a stationary component that guides the head(s) and lifts them off the surface of the storage medium during unload and guides the head(s) to move down the ramp during loading onto the storage medium. Unlike utilizing a landing zone on the storage medium to park the heads, a load/unload ramp provides a place for the head(s) to be positioned away from the storage medium such that more space of the storage medium can be used for useable data.

A load/unload ramp positioned adjacent the storage medium, however, requires space in the data storage system, thereby limiting how small the data storage system can be. This especially becomes problematic in smaller form factors. In addition, the load/unload ramp positioned adjacent the storage medium can be difficult to assemble. High precision is needed in assembling the load/unload ramp such that the delicate suspension and head are able to properly merge onto the ramp. Therefore, there is a need to load and unload a head of a disc drive that does not limit data storage space, is easy to assemble and is cost effective.

SUMMARY

An actuator assembly is provided. The actuator assembly includes an actuator arm rotatable about a pivot point and configured to access data on a storage medium. The actuator arm has a base end coupled to a lift tab and a distal end coupled to a transducing head. The actuator assembly includes an inclined surface located adjacent the base end. The inclined surface is configured to engage with the lift tab to guide the transducing head away from the storage medium.

These and various features and benefits will be apparent upon reading the following detailed description and review of the associated drawings.

DETAILED DESCRIPTION OF ILLUSTRATIVE EMBODIMENTS

Figure 1:
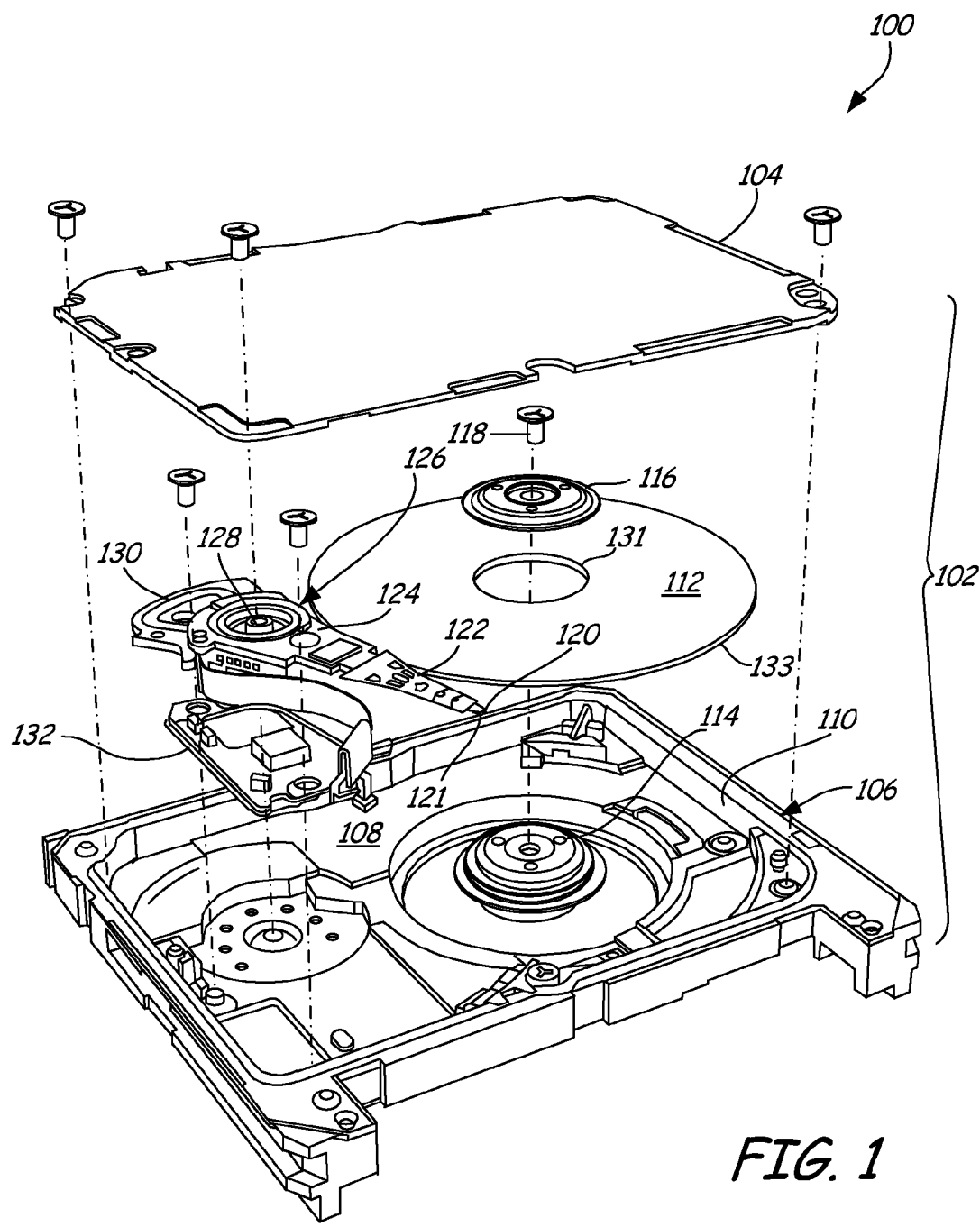
FIG. 1 is an exploded perspective view of a disc drive.

FIG. 1 is an exploded perspective view of a disc drive 100 in which embodiments of the present invention are useful. Disc drives are common data storage systems. One or more embodiments of the present invention are also useful in other types of data storage and non-data storage systems.

Disc drive 100 includes a housing 102 having a top cover 104 and a base 106. As shown, top cover 104 attaches to base 106 to form an enclosure 108 enclosed by a perimeter wall 110 of base 106. A plurality of components are positioned in disc drive 100 and are enclosed in enclosure 108 of housing 102. As shown, disc drive 100 includes a disc or medium 112. Although a disc drive can include more than one disc, it should be understood that embodiments of the disclosure pertain to disc drives that include a single disc. Medium 112 stores information in a plurality of circular, concentric data tracks and is mounted on a spindle motor 114 by a disc clamp 116 and pin 118. It should be noted, however, that embodiments of the invention, as discussed with reference to FIG. 7, include alternative ways of mounting medium 112 to spindle motor 114. For example, medium 112 can be adhered to spindle motor 114. Spindle motor 114 rotates medium 112 causing its data surfaces to pass under respective bearing slider surfaces. As illustrated in FIG. 1, a top surface of medium 112 has an associated slider 120, which carries transducers that communicate with the top surface of the medium. Slider 120 and its transducers are often together referred to as a head 121. Although each surface of a medium in a disc drive can have an associated head, it should be understood that some embodiments of the disclosure pertain to a disc drive including a single head that communicates with a single surface of the medium.

In the example shown in FIG. 1, slider 120 is supported by a suspension assembly 122, which is, in turn, attached to an actuator arm 124 of an actuator assembly 126. Actuator assembly 126 is laterally rotated about a shaft 128 by a voice coil motor 130, which is controlled by servo control circuitry within circuit 132. Voice coil motor 130 rotates actuator assembly 126 to position slider 120 relative to desired data tracks, between a disc inner diameter 131 and a disc outer diameter 133.

When a disc drive is de-energized, the actuator assembly can move the head or heads, which are attached to actuator arms to a location removed from the data portion of the disc. For example, the actuator assembly can move the head(s) to a load/unload ramp, which serves as a park location that is adjacent the disc. Generally, the load/unload ramp is a stationary component that guides the head(s) and lifts them off the surface of the storage medium during unload and guides the head(s) to move down the ramp during loading onto the disc(s). Unlike utilizing a landing zone on the disc to park the heads, a load/unload ramp located adjacent the disc provides a place for the head(s) to be positioned away from the storage medium such that more space of the storage medium can be used for useable data.

Embodiments of the disclosure provide yet another alternative for loading an unloading a head that corresponds with a top surface of a disc. As will be discussed in detail below, embodiments of the disclosure provide a load/unload ramp that is adjacent a base end of the actuator assembly in a disc drive. Such a load/unload ramp allows the actuator arm tilt about an axis such that the base end of the actuator arm is angled towards the base of the disc drive and distal end of the actuator arm is tilted towards the top cover of the disc drive. This scheme allows the head to be unloaded from the disc.

Figure 2:
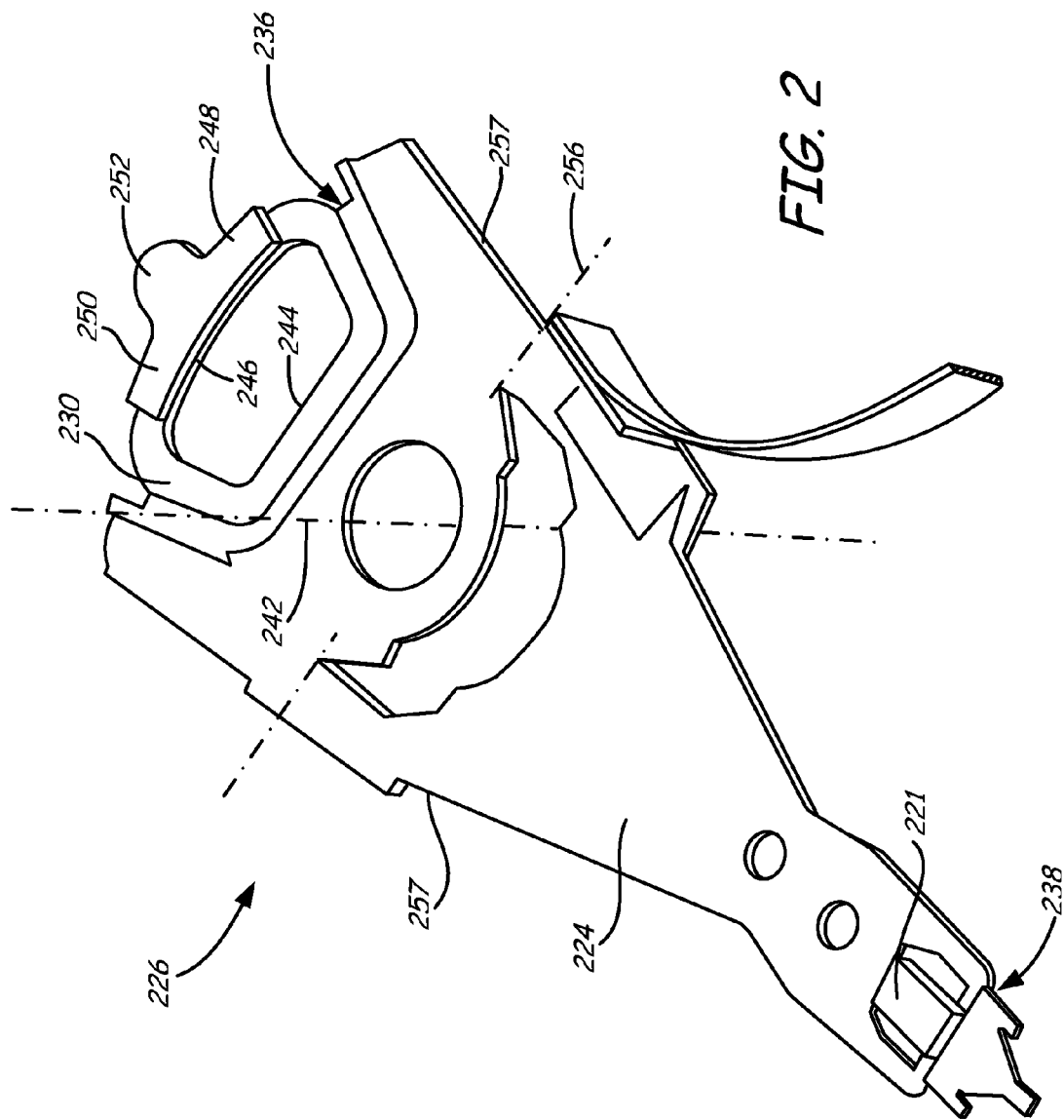
FIG. 2 illustrates a bottom perspective view of an actuator assembly.

FIG. 2 illustrates a bottom perspective view of one embodiment of an actuator assembly 226. Actuator assembly 226 includes an actuator arm 224 having a base end 236 and a distal end 238. Actuator arm 224 also includes a voice coil motor (VCM) 230 positioned at base end 236. VCM 230 is configured to rotate actuator arm 224 about an axis or pivot point 242 provided by a pivot cartridge (not illustrated in FIG. 2) to position head 221 coupled to distal end 238 relative to desired data tracks on a disc. VCM 230 includes an inner leg 244 and an outer leg 246. Outer leg 246 is positioned closer to base end 236 than inner leg 244. Coupled to outer leg 246 of VCM 230 includes a lift tab 248. Lift tab 248 includes a base portion 250 and a tab portion 252. Base portion 250 is attached to outer leg 246 of VCM 230 by, for example, an adhesive. Tab portion 252 protrudes from base portion 250 and therefore outer leg 246 of VCM 230. Lift tab 248 is configured for engagement with an inclined surface that is adjacent base end 236 of actuator arm 224 to thereby lift head 221 away from a disc towards a top cover of a disc drive into a parked position or unloaded position. Details regarding the engagement of a lift tab with an inclined surface and movement to the parked position are discussed below.

Figure 3:
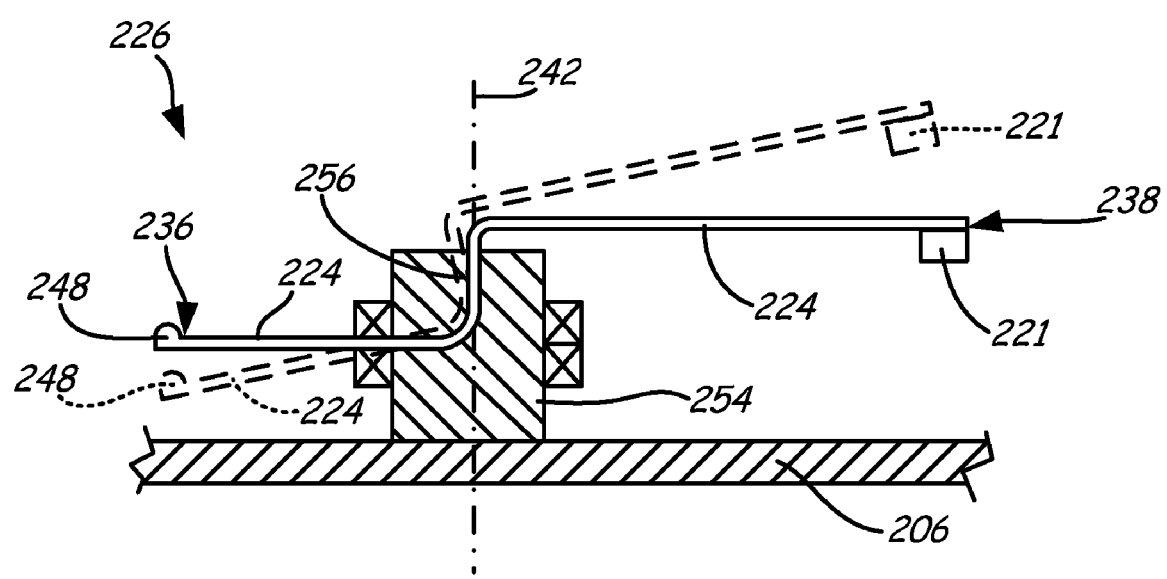
FIG. 3 illustrates a simplified sectional diagram of the actuator assembly illustrated in FIG. 2.

FIG. 3 illustrates a simplified sectional diagram of actuator assembly 226 including a pivot cartridge 254 attached to a base 206 of a disc drive. FIG. 3 illustrates actuator arm 224, head 221 positioned at distal end 238, lift tab 248 positioned at base end 236 and axis or pivot point 242 about which VCM 230 (FIG. 2) laterally rotates actuator arm 224. Pivot cartridge 254 provides axis or pivot point 242. As illustrated in the embodiment of both FIGS. 2 and 3, actuator arm 224 includes an integrated hinge point 256, which forms a bend between the outer side edges 257 (FIG. 2) of actuator arm 224 and is perpendicular to axis 242. Hinge 256 is indicated by dashed lines in FIG. 2.

While FIG. 3 illustrates actuator arm 224 in an operating position or loaded position, FIG. 3 also illustrates actuator arm 224 in a parked position or unloaded position which is indicated by dashed lines. Details regarding the engagement of lift tab 248 with an inclined surface for transition between loaded and unloaded positions will be discussed below. Hinge 256 provides a point at which base end 236 of actuator arm 234 can be tilted in a direction towards base 206 and distal end 238 of actuator arm 224 can be tilted in a direction towards a top cover. Hinge 256 can also provide a preload force on head 221 when actuator arm 224 is in a loaded position. By hinge 256 providing a preload force, a suspension, which generally supports head 221 as well as conventionally provides a head with a preload force, can be integrally formed with the actuator arm 224. The suspension and actuator arm 224 can be integrally formed into a single unit because the vertical freedom of movement that head 221 requires is now provided by hinge 256 instead of by a region of a suspension.

In the embodiment illustrated in FIGS. 2 and 3 and in a loaded position, a section of actuator arm 224 is closer to base 206 from base end 236 of actuator arm 224 to hinge 256 than the actuator arm 224 from distal end 238 to hinge point 256. However, it should be recognized that hinge 256 can be located anywhere between lift tab 248 and head 221 and the outer side edges 257 of actuator arm 224. It should also be recognized that actuator arm 224 can be separated from base 206 at a constant distance along its entire length rather than as illustrated the loaded position in FIG. 3.

Figure 4:
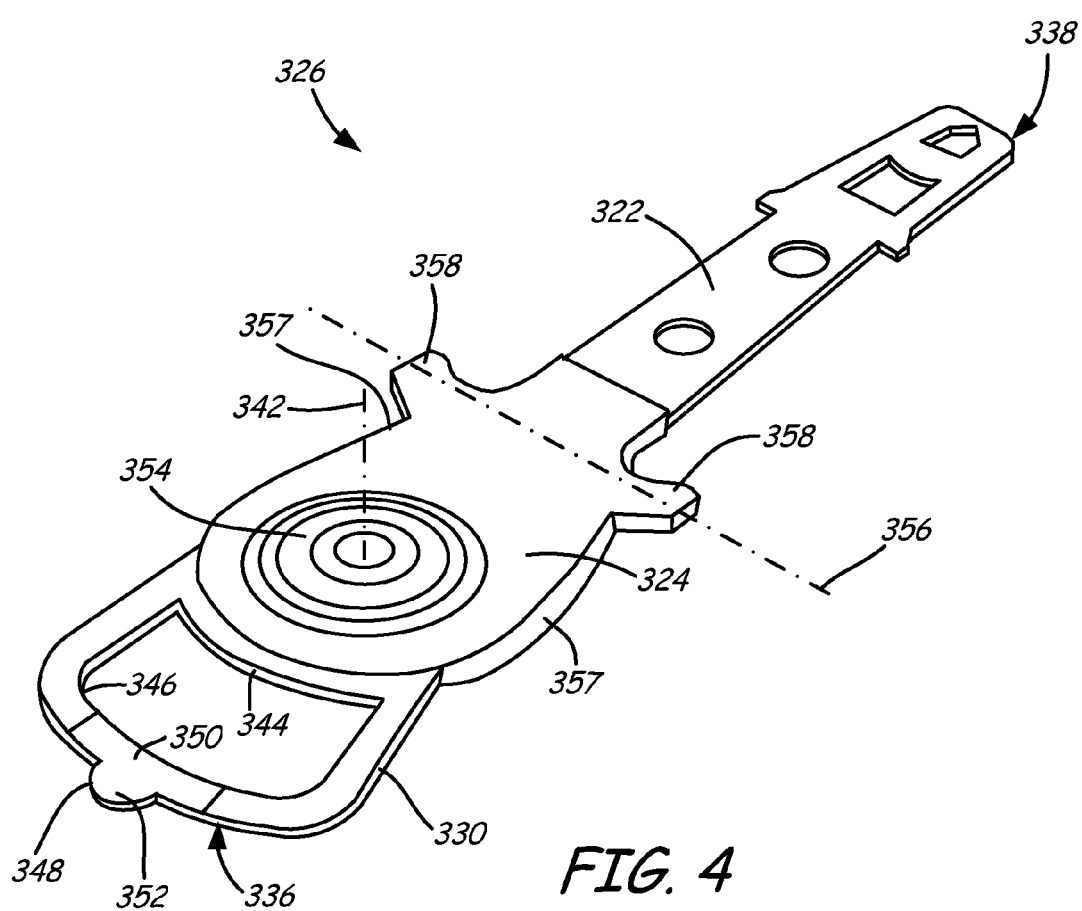
FIG. 4 illustrates a top perspective view of an actuator assembly.

FIG. 4 illustrates a top perspective view of another embodiment of an actuator assembly 326. Actuator assembly 326 includes an actuator arm 324 having a base end 336 and a distal end 338. Actuator arm 324 also includes a VCM 330 positioned at base end 336. VCM 330 is configured to rotate actuator arm 324 about an axis or pivot point 342 provided by a pivot cartridge 354 to position a head (hidden from view in FIG. 4) coupled to distal end 338 relative to desired data tracks on a disc. VCM 330 includes an inner leg 344 and an outer leg 346. Outer leg 346 is positioned closer to base end 336 than inner leg 344. Coupled to outer leg 346 of VCM 330 includes a lift tab 348. Lift tab 348 includes a base portion 350 and a tab portion 352. Base portion 350 is attached to outer leg 346 of VCM 330 by, for example, an adhesive. Tab portion 352 protrudes from base portion 350 and therefore outer leg 346 of VCM 330. Lift tab 348 is configured for engagement with an inclined surface that is adjacent to base end 336 of actuator arm 324 to thereby lift head 321 away from a disc towards a top cover of a disc drive into a parked position or unloaded position. In FIG. 4, suspension 322 is not formed integrally with actuator arm 324 and hinge 356 is located at pivot points 358. Hinge 356 forms a bend between outer side edges 357 of actuator arm 324 and pivot points 358 are biased by the gram load spring area of the suspension 322. As previously stated, details regarding the engagement of a lift tab with an inclined surface and movement to the parked position will be discussed below.

Figure 5:
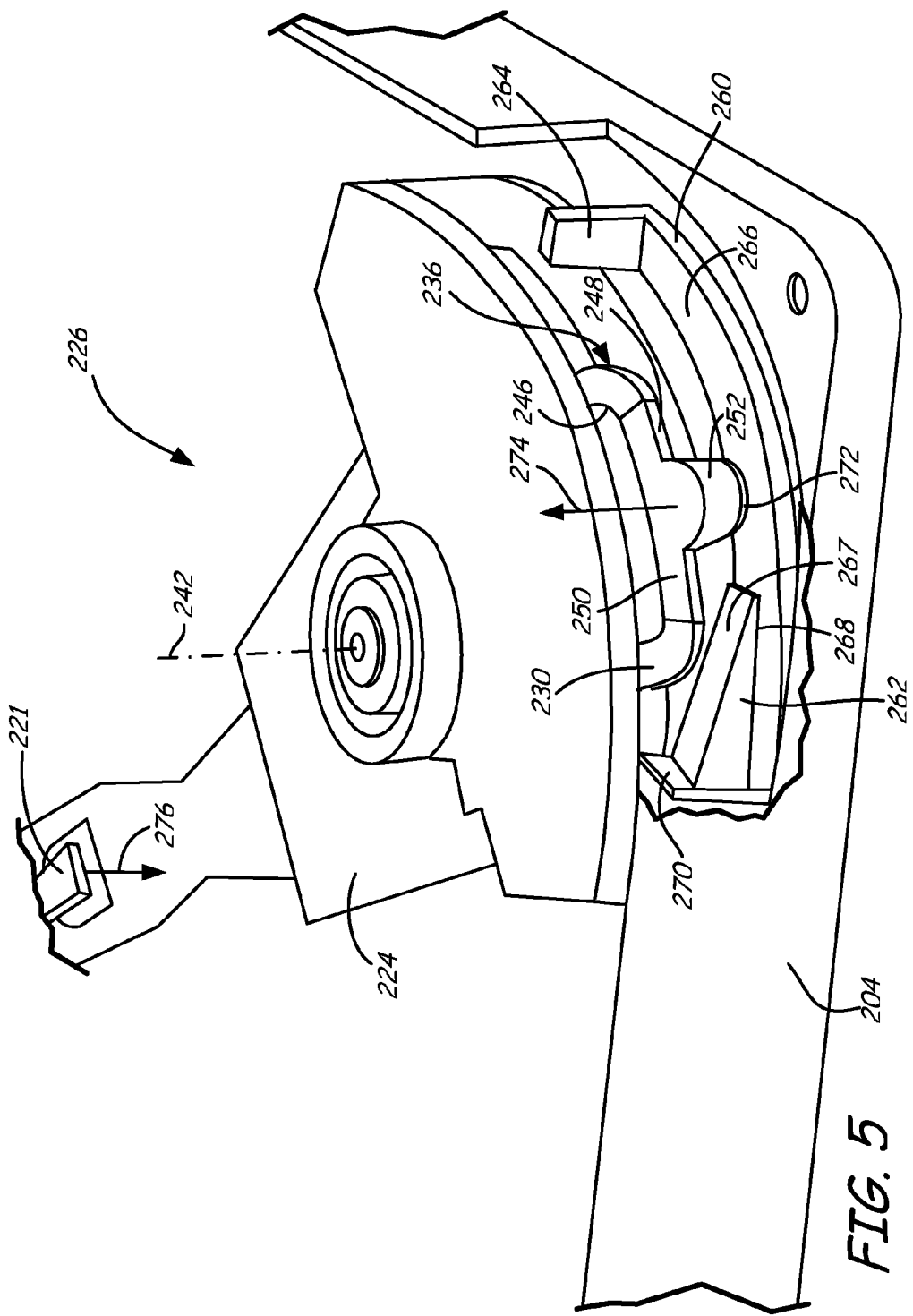
FIG. 5 illustrates a bottom perspective view of the actuator assembly of FIGS. 2 and 3 mounted to a top cover, including a ramp and crash stop.

FIG. 5 illustrates a bottom perspective view of actuator assembly 226 (previously illustrated in FIGS. 2 and 3) and a top cover 204 of a disc drive. FIG. 5 also illustrates actuator assembly 226 including a crash stop 260 mounted to top cover 204 and a ramp 262. Crash stop 260 is located adjacent a base end 236 of actuator arm 224 and includes a first side end 264 and a second side end 270. First side end 264 and second side end 270 are coupled together by top end 266 which is mounted to top cover 204. Ramp 262 is also located adjacent base end 236 of actuator assembly 226 and includes an inclined surface 267 and a top surface 268. Although not illustrated in FIG. 5, in one embodiment ramp 262 is integrally formed with second side end 270 of crash stop 260 and bottom surface 268 of ramp 262 is spaced apart from top end 266 of crash stop 260. It should be noted, however, that in other embodiments ramp 262 can be coupled to second side end 270 of crash stop 260. Also illustrated in FIG. 5 includes VCM 230 having outer leg 246. Lift tab 248 is coupled to outer leg 246 of VCM 230 and includes tab portion 252. Tab portion 252 protrudes from outer leg 246 of VCM 230 and is positioned above top end 266 of crash stop 260.

During the accessing of tracks to either read or write data, as VCM 230 laterally rotates actuator arm 224 about axis or pivot point 242, lift tab 248 will laterally swing back and forth freely below and along top end 266 of crash stop 260. If the head coupled to a distal end of actuator assembly 226 should travel too far out near the outer diameter of a disc, tab portion 252 will "crash" into first side end 264 of crash stop 260 such that actuator assembly 226 stays within the region of the disc. More specifically, first side end 264 prevents actuator assembly 226 from pivoting beyond the outer diameter of the disc.

Figure 6:
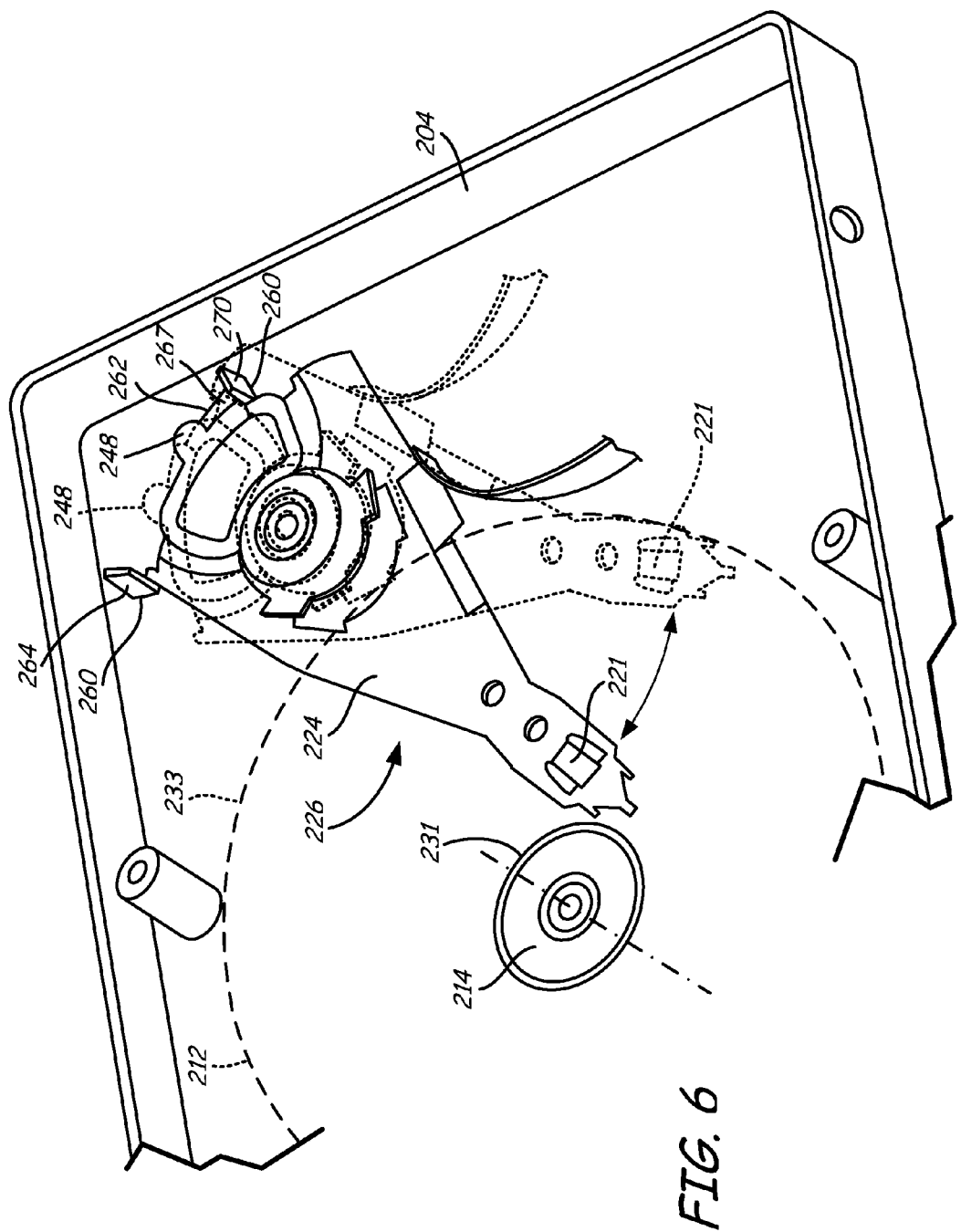
FIG. 6 illustrates a bottom perspective view of the actuator assembly, ramp, crash stop and top cover illustrated in FIG. 5.

FIG. 6 illustrates a bottom perspective view of actuator assembly 226 and a top cover 204. It should be noted that in the alternative, actuator assembly 226 could be mounted to a base of a disc drive. It should also be noted that crash stop 260 and ramp 262 can be mounted to a base of a disc drive as well. FIG. 6 illustrates head 221 in a first lateral position as indicated by the solid lines and head 221 in a second lateral position as indicated by the dashed lines. The first lateral position is a loaded position of which head 221 is close to an inner diameter 231 of a disc 212 (as illustrated in dashed lines) and the second lateral position is a loaded position of which is close to an outer diameter 233 of the disc 212. As illustrated in FIG. 6, when head 221 is in the first lateral position, lift tab 248 is located at the beginning of inclined surface 267 of ramp 262. As also illustrated in FIG. 6 the end of inclined surface 267 is illustrated as coupled to a second side end 270 of crash stop 260. As illustrated in FIG. 6, when head 221 is in the second position, lift tab 248 is located adjacent first side end 264 of crash stop 260.

With reference to both FIGS. 5 and 6, the process of unloading and loading head 221 is described. To unload head 221 when actuator assembly 226 is non-operational (for example during idle), VCM 230 moves actuator arm 224 beyond the inner diameter 231 of the disc and towards the spindle motor 214. This movement causes a dome 272 (FIG. 5) of tab portion 252 of lift tab 248 to be pushed by inclined surface 267 of ramp 262 in a direction towards a base of a disc drive. In FIG. 5, that direction is indicated by arrow 274. With lift tab 248 located at base end 238 being pushed towards the base of the disc drive, head 221 is caused to rise towards top cover 204 of the disc drive. In such a position, head 221 is located above spindle motor 214 in a parked position. In FIG. 5 that direction is indicated by arrow 276. Conversely, to load head 221 when actuator assembly is ready for operation, VCM 230 moves actuator arm 224 towards outer diameter 233. This movement causes dome 272 to be removed from inclined surface 267 of ramp 262. In such a position, head 221 descends towards disc 212 for operation.

Figure 7:
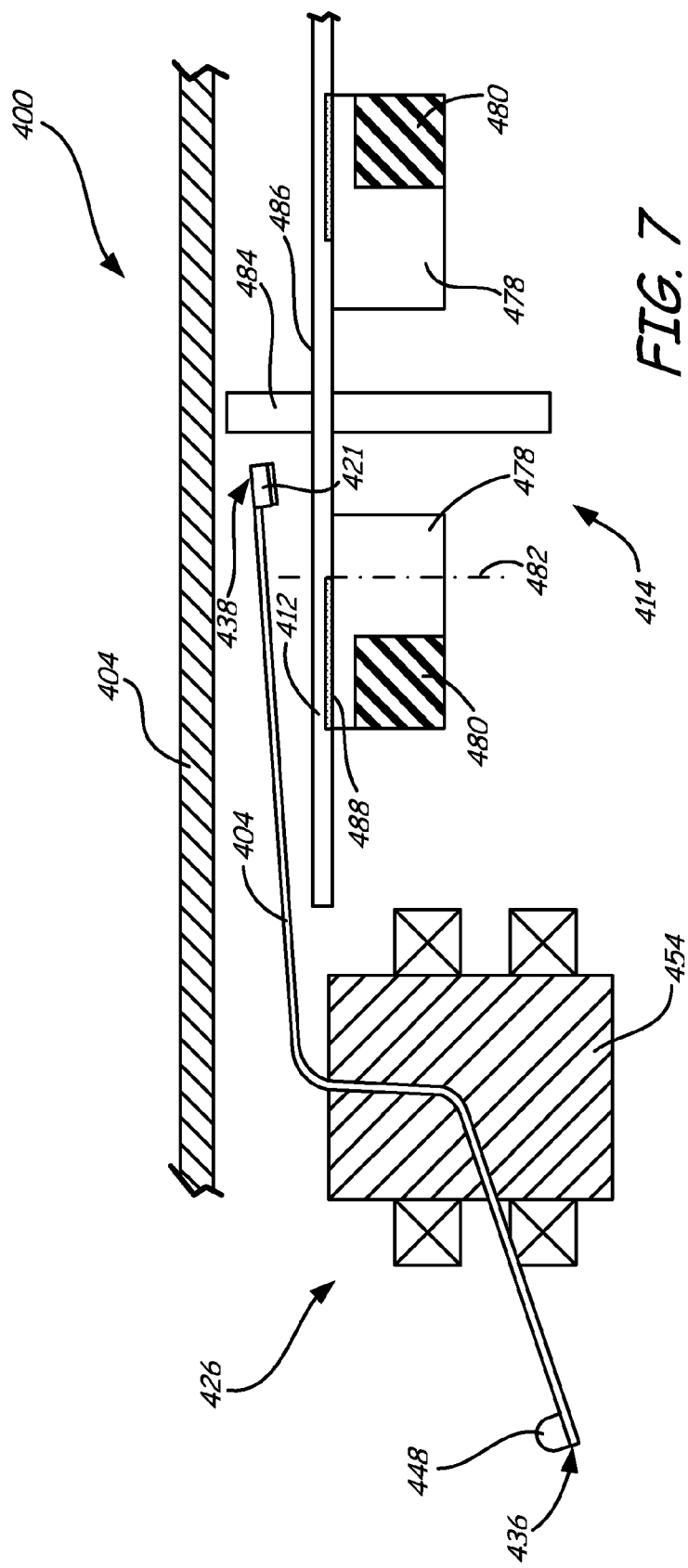
FIG. 7 illustrates a simplified sectional diagram of a disc drive including an actuator assembly in a parked position.

FIG. 7 illustrates a simplified sectional diagram of a disc drive 400 including an actuator assembly 426, a disc 412, a spindle motor 414 and a top cover 404. Actuator assembly 426 includes a base end 436, a distal end 438, an actuator arm 424 and a pivot cartridge 454. Spindle motor 414 includes a hub 478 and a magnet 480 surrounding the hub 478. Dashed line 482 indicates an interface between disc 412 and spindle motor 414. In FIG. 7, actuator 424 is indicated as being in a parked position. Lift tab 448 at base end 436 is angled towards a base of disc drive 400 and head 421 at distal end 438 is angled over spindle motor 414. With head 421 being in close proximity to top cover 404 when actuator assembly 426 is in a parked position, there is a potential that head 421 can be damaged by deflection of top cover 404. To protect head 421 from top cover 404, spindle motor includes a deflection limiter 484. Deflection limiter 484 protrudes from a top surface 486 of spindle motor 414 towards top cover 404. More particularly, deflection limiter 484 protrudes from top surface 486 of spindle motor 414 towards top cover 404 such that deflection limiter 484 is located above head 421 located at distal end 438 of actuator assembly 426 in a parked position. Such a position of deflection limiter 484 will prevent any deflection in top cover 404 from contacting head 421. Deflection limiter 484 can be integrated with spindle motor 414 or coupled to spindle motor 414.

As illustrated in FIG. 7 and in one embodiment, an adhesive 488 is used to mount disc 412 to spindle motor 414 instead of a conventional disc clamp. Adhesive 488 allows the clearance between head 421 in the parked position and disc 412 to comparably increase then if disc 412 was mounted to spindle motor 414 using a conventional disc clamp. Other advantages of using adhesive 488 include a reduced vertical spacing in disc drive 400 and data area increase on disc 412.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on the type of construction of an actuator assembly and type of construction of a disc drive while maintaining substantially the same functionality without departing from the scope and spirit of the present invention. In addition, although the preferred embodiment described herein is directed to an actuator assembly for a disc drive, it will be appreciated by those skilled in the art that the teachings of the present invention can be applied to other types of storage systems, without departing from the scope and spirit of the disclosure.

What is claimed is:

1. An actuator assembly comprising:
   an actuator arm rotatable about a pivot point and configured to access data on a storage medium, the actuator arm having a base end coupled to a lift tab and a distal end coupled to a transducing head;
   a crash stop located adjacent the base end of the actuator arm, the crash stop comprising a first side end having a first inner-facing surface that prevents the transducing head from traveling beyond an outer diameter of a storage medium, a second side end having a second inner facing surface and a top end having a bottom facing surface that couples the first side end to the second side end, the first inner facing surface of the first side end and the second inner facing surface of the second side end being substantially perpendicular to the bottom facing surface of the top end; and
   a ramp having an inclined surface and an opposing top surface that is parallel with the bottom facing surface of the top end of the crash stop, the ramp being directly coupled to and protruding from the second inner facing surface of the second side end of the crash stop to a point between the first side end and the second side end of the crash stop, wherein upon rotation of the actuator arm about the pivot point to the inner diameter of the storage medium the lift tab slides along the inclined surface to tilt the actuator arm about a hinge for guiding the transducing head away from the storage medium.

2. The actuator assembly of claim 1, wherein the top surface of the ramp faces and is spaced apart from the bottom facing surface of the top end of the crash stop.

3. The actuator assembly of claim 2, wherein the ramp is integrally formed with the second inner facing surface of the second side end of the crash stop.

4. The actuator assembly of claim 1, wherein the actuator arm further comprises a voice coil motor located at the base end of the actuator arm including an outer leg closer to the base end than an inner leg.

5. The actuator assembly of claim 4, wherein the lift tab is coupled to the outer leg of the voice coil motor.

6. The actuator assembly of claim 1, wherein the hinge further provides a preload force to the transducing head and allows the distal end of the actuator arm to move towards a top cover of a data storage system.

7. A data storage system comprising:
an actuator arm rotatable about a pivot point and configured to access data on the storage medium, the actuator arm having a base end coupled to a lift tab and a distal end coupled to a transducing head;
a crash stop located adjacent the base end of the actuator arm, the crash stop comprising a first side end that prevents the transducing head from traveling beyond an outer diameter of a storage medium, a second side end and a top end that couples the first side end to the second side end, the first side end and second side end being substantially perpendicular to the top end; and
a ramp located adjacent the base end and directly coupled to an inner facing surface of the second side end of the crash stop and protruding from the inner facing surface to a point between the first side end and the second side end of the crash stop, the ramp having a fixed inclined surface that is configured to engage with the lift tab to guide the distal end of the actuator arm towards a top cover of the data storage system.

8. The data storage system of claim 7, wherein the ramp is integrally formed with the inner facing surface of the second side end of the crash stop.

9. The data storage system of claim 7, wherein the lift tab is coupled to a voice coil motor located at the base end of the actuator arm for rotating the actuator arm about the pivot point.

10. The data storage system of claim 7, wherein the actuator arm further comprises a hinge that allows the distal end of the actuator arm to move towards the top cover of the data storage system.

11. The data storage system of claim 10, wherein the hinge extends between side edges of the actuator arm.

12. The data storage system of claim 11, wherein the hinge is located between the base end and the distal end.

13. The data storage system of claim 12, wherein the hinge is located at the pivot point.

14. The data storage system of claim 11, wherein the hinge provides a preload force to the transducing head.

15. The data storage system of claim 7, further comprising a deflection limiter coupled to a top surface of a spindle motor which is configured to rotate the storage medium, the deflection limiter configured to protect the transducing head from deflection of the top cover of the data storage system while the actuator arm is in a parked position.

16. An actuator assembly comprising:
an actuator arm rotatable about a pivot point and having a base end and a distal end, the base end coupled to a lift tab and the distal end coupled to a transducing head;
a crash stop located adjacent the base end of the actuator arm, the crash stop comprising a first side end having a first inner facing surface that prevents the transducing head from traveling beyond an outer diameter of a storage medium, a second side end having a second inner facing surface and a top end having a bottom facing surface that couples the first side end to the second side end, the first inner facing of the first end and the second inner facing surface of the second side end being substantially perpendicular to the bottom facing surface of the top end; and
a ramp located adjacent the base end and directly coupled to an inner facing surface of the second side end of the crash stop and protruding from the inner facing surface to a point between the first side end and the second side end of the crash stop, the ramp having an inclined surface and an opposing top surface spaced apart from and facing the bottom facing surface of the top end of the crash stop, wherein the inclined surface is configured to engage with the lift tab to guide the transducing head into an unloaded position and disengage with the lift tab to guide the actuator arm into a loaded position.

* * * * *